United States Patent

Buhl

[11] Patent Number: 4,765,770
[45] Date of Patent: Aug. 23, 1988

[54] SELF-ADJUSTING PIVOT JOINT WITH AXIAL PLAY FOR MOTOR VEHICLES

[75] Inventor: Reinhard Buhl, Bohmte, Fed. Rep. of Germany

[73] Assignee: Lemforder Metallwaren AG, Fed. Rep. of Germany

[21] Appl. No.: 79,580

[22] Filed: Jul. 29, 1987

[30] Foreign Application Priority Data

Apr. 9, 1987 [DE] Fed. Rep. of Germany ....... 3711971

[51] Int. Cl.⁴ ............................................. F16C 11/00
[52] U.S. Cl. .................................... 403/146; 403/147; 403/136
[58] Field of Search ............... 403/147, 136, 163, 165, 403/131, 226, 146, 262

[56] References Cited

U.S. PATENT DOCUMENTS 1,909,100  5/1933  Geyer .............................. 403/226 X
4,101,227  7/1978  Herbenar et al. ................ 403/147 X Primary Examiner—Andrew V. Kuhdrat
Attorney, Agent, or Firm—McGlew and Tuttle

[57] ABSTRACT

The self adjusting pivot joint with axial play for motor vehicles includes a housing and a pivot, rotatably seated at one end therein by means of a bearing of elastically deformable material, slitted in the lengthwise direction, whereby the outer conical bearing is fitted into a corresponding conical recessed portion of the housing and a prestressed spring is loaded in the direction of the conical tip, between the bearing, on one end, and a closing part of the housing, on the other. The pivot is provided with a peripheral recessed portion, which extends by its width in the direction of the lengthwise axis of the pivot and engages with an inner projection of the bearing, the width of which is less than that of the peripheral recess of the pivot.

5 Claims, 1 Drawing Sheet

SELF-ADJUSTING PIVOT JOINT WITH AXIAL PLAY FOR MOTOR VEHICLES

FIELD AND BACKGROUND OF THE INVENTION

This invention relates in general to pivot joint constructions and in particular to a new and useful selfadjusting pivot joint with an axial play particularly for motor vehicles.

A similar pivot joint is known from U.S. Pat. No. 4,101,227. These are special pivot joints for the running gear elements or such parts in motor vehicles which must be joined together swinging without radial play, or in similar fashion able to turn, but at the same time able to change their axial distance from each other. The conical mounting of the bearing in the conical housing configuration with the prestressed helical spring between a cover of the housing and the front face of the, bearing contiguous with the base of the cone, automatically affords a regulation for wear, so that there can be no free play. To prevent the pivot from falling out of the bearing axially, the pivot has an outwardly projecting shoulder at its free end, and the pivot with its threaded stem for fastening the parts, is previously placed in a roughcast housing, open at the rear, and the open end of the housing is then closed by means of a cover, which is secured by a flanged rim, and which compresses the spring between itself and the bearing, so that the shoulder of the pivot is axially movable between the cover and the front face of the bearing, directed toward the cover. This defines the required axial play and at the same time protects aginst loss of the pivot. The patent shows a configuration whereby the pivot carries at its free end a process that is thinner than the diameter of the pivot, whose front face at the free end together with the inner surface of the cover form stops which limit the axial play.

SUMMARY OF THE INVENTION

The invention proposes to realize a more cost effective fabrication of such pivot joint, which also enables its use in joints with an open housing at the front end.

According to the invention, the pivot is retained by its peripheral recess, in conjunction with a projection in the interior of the bearing, which engages in a peripheral recessed portion. At the same time, this configuration avoids abrupt limitation of the axial motion of the pivot with respect to the housing by stops, so that axial impact loads do not arise between the pivot and the housing. Within the bounds of mobility of the projection in the peripheral recessed portion in the direction of the lengthwise axis of the pivot, the pivot is also axially movable within the housing. An important advantage of this configuration in the possibility of fabricating the pivot from a cylindrical roughcast rod, which produces a substantial cost savings in comparison to the state of the art, where the pivot is produced by pressing or, alternatively, by material forming. The arrangement of the projection inside the bearing does not notably increase its production cost. The preference is for a peripheral recess with a flat bottom, extending parallel to the axis of the seating surface of the pivot and engaging with an inner projection of the bearing, which is formed as a peripheral rib or bulge. This rib or bulge can be made of the same material as the bearing in a single piece.

Also of special advantage, however, is the possibility of inserting a pivot configured with the features of the invention with its seating end forwards into the housing from the open end of the housing so that the housing can be closed by means of a sealing ring enclosing the shaft of the pivot. Such bearing configurations are preferred in many applications. The features of the invention now enable the use of this bearing type for special pivot joints of the category in the invention.

Accordingly, it is an object of the invention to provide a self-adjusting pivot joint with axial play for motor vehicles, comprising a housing having a closing part at one end, a pivot joint rotatably seated in said housing adjacent the one end and a bearing of elastically deformable material between said pivot end of the housing which is slitted lengthwise or axially and is outwardly conical toward one end thereof. The housing has a conical recess in which the conical bushing is fitted with a prestressed spring urging the bearing in the direction of the narrow end. The spring is disposed between the bearing and a closing part of the housing, the pivot and bearing having an interfitting projection and peripheral recess which are widened in the direction of the longitudinal axis of the pivot and the width of the projection is less than that of the recess.

A further object of the invention is to provide a self-adjusting pivot joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

GENERAL DESCRIPTION OF THE PREFERRED EMBODIMENT

Figure 1:
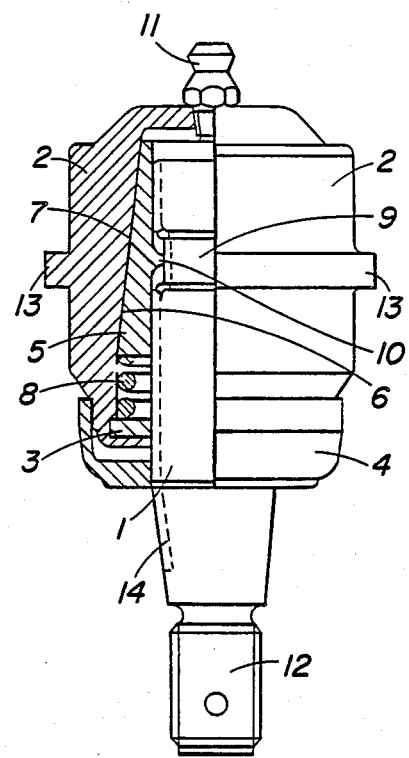
FIG. 1 is a partial elevational and partial sectional view of a pivot joint constructed in accordance with the invention.

Referring to the drawings in particular, the invention embodied therein comprises a self-adjusting pivot joint provided with axial play in particular for motor vehicles and defining a cavity and has one and an opposite end, with a closing part adjacent to one end as shown in FIG. 1. A pivot member 1 is seated in the housing adjacent to said closed end in a bearing 5 of elastically deformable material. The bearing 5 is advantageously slotted in a lengthwise or axial direction and is outwardly conical towards the end of said housing. Said housing defines a conical cavity into which the cylindrical bearing 5 is fitted with a prestressed spring which is positioned in a loaded state abutting the end of the conical formation of the bearing 5 and is positioned between the end of the bearing 5 and the closed end or closing part of the housing which comprises a sealing ring 3. In accordance with the invention, the bearing 5 has a projection 10, which engages with a recessed portion 9. Said recessed portion 9 is disposed in the direction of the longitudinal axis of the pivot wherein the width of the projection is less than that of the recess. In the embodiment of FIG. 1, the projection is formed on the bearing 5, and the recessed portion is formed on the pivot 1.

Figure 2:
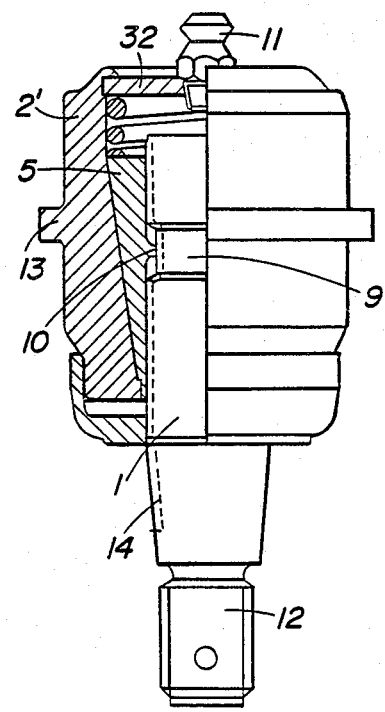
FIG. 2 is a view similar to FIG. 1 of another embodiment of the invention.

The example in FIG. 1 shows a preferred configuration, and; FIG. 2 another embodiment with similar elements designated by primed numerals, whereby the pivot 1 with its seating end forwards is inserted into the housing 2 from the open front end, which is closed by a sealing ring 3, enclosing the shaft of the pivot 1 and secured by a flanged rim. A collar 4 prevents dust or other impurities from getting into the pivot joint. In the housing 2, the cylindrical free end of the pivot 1 is seated in a bearing 5 with cylindrical inner surface area, said surface area having slits in lengthwise direction. The outer lateral surface 6 of the bearing 5 is tapered and fits in abutting engagement with a corresponding conical inner surface area 7 of housing 2.

Between the front edge of the bearing 5 at the base of the conical surfaces 6 and 7 and the inner surface of the sealing ring 3 there is a prestressed helical spring 8, which urges the bearing 5 in the direction of the end of the cylinder, thereby avoiding any radial play. In the seating area within the bearing 5 the cylindrical end of the pivot 1 is provided with a peripheral recessed portion 9 which extends in the axial direction of the pivot and engages with an inner projection 10 of the bearing 5 which in the present instance is configured as a peripheral rib or swelling. This rib or swelling is not as wide as the recessed portion 9, so that the pivot 1 is correspondingly mobile in the axial direction. The bearing can be permanently filled with grease, although a continuous replenishment by a lubricating nipple 11, is also possible. The end of the pivot 1 protruding outside the housing is provided with a threaded stem 12 to fasten the invention to a motor vehicle. Connection of the parts of the housing can be done above or below the outer shoulder 13 on the housing 2, e.g., by press fitting.

To extend the lifetime, the pivot 1 can be surface hardened, including in its seating region within the bearing 5 as indicated by the broken line 14 in the drawing.

What is claimed is:

1. A self adjusting pivot joint with axial play for motor vehicles, comprising;
    a housing having a first end and an opposite end with a closing part, a pivot member rotatably seated in said housing adjacent to one of said ends;
    a bearing of elastically deformable material disposed within said housing about said pivot, said bearing being slit lengthwise and having a conical shape tapering from one end toward a terminating inner opposite end tip;
    said housing defining a cavity into which said conical bearing is fitted a prestressed spring disposed between said bearing and one of said ends of said bearing to urge said housing away from said closing part of said housing;
    said pivot member having a recessed portion interfitting with a recessed portion of said bearing, said projection widened in the direction of the longitudinal axis of said pivot, said projection being less wide than said recessed portion.

2. A pivot joint according to claim 1 wherein said pivot has a peripheral recessed portion having a flat bottom extending parallel to the axis of the seating surface of said pivot.

3. A pivot joint according to claim 1 wherein said bearing has a projection and said pivot has a recessed portion and wherein the projection of said bearing is formed as a peripheral rib.

4. A pivot joint according to claim 3 wherein said rib is formed of the same material as said bearing in a single piece therewith.

5. A pivot according to claim 1 wherein said housing forms a closure at said one end and wherein the cavity defined by the housing reaches inwardly towards said closed end, said bearing having a tip facing said closed end and including a sealing ring around said pivot closing the housing at its opposite end and supporting said prestressed spring.

* * * * *